United States Patent
Pinto et al.

(10) Patent No.: US 10,650,805 B2
(45) Date of Patent: May 12, 2020

(54) METHOD FOR SCORING IN AN AUTOMATIC SPEECH RECOGNITION SYSTEM

(71) Applicant: Nuance Communications, Inc., Burlington, MA (US)

(72) Inventors: Joel Pinto, Aachen (DE); Daniel Willett, Walluf (DE); Christian Plahl, Wurselen (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/510,434

(22) PCT Filed: Sep. 11, 2014

(86) PCT No.: PCT/US2014/055116
§ 371 (c)(1),
(2) Date: Mar. 10, 2017

(87) PCT Pub. No.: WO2016/039751
PCT Pub. Date: Mar. 17, 2016

(65) Prior Publication Data
US 2017/0294186 A1    Oct. 12, 2017

(51) Int. Cl.
*G10L 15/16* (2006.01)
*G10L 15/32* (2013.01)
(Continued)

(52) U.S. Cl.
CPC ............ *G10L 15/16* (2013.01); *G10L 15/063* (2013.01); *G10L 15/30* (2013.01); *G10L 15/32* (2013.01)

(58) Field of Classification Search
CPC ....... G10L 15/16; G10L 15/063; G10L 15/30; G10L 15/32
(Continued)

(56) References Cited

U.S. PATENT DOCUMENTS 5,749,066 A * 5/1998 Nussbaum ............ G10L 15/063
704/232
5,751,904 A * 5/1998 Inazumi ............... G06N 3/0454
704/232

(Continued)

FOREIGN PATENT DOCUMENTS

WO    2013149123 A1    10/2013

OTHER PUBLICATIONS

International Search Report issued in related International App. No. PCT/US2014/055116 dated Dec. 4, 2014.
(Continued)

*Primary Examiner* — Jakieda R Jackson
(74) *Attorney, Agent, or Firm* — Brian J. Colandreo; Michael T. Abramson; Holland & Knight LLP

(57) ABSTRACT

A system and method for speech recognition is provided. Embodiments may include receiving an audio signal at a first deep neural network ("DNN") associated with a computing device. Embodiments may further include receiving the audio signal at a second deep neural network ("DNN") associated with a computing device, wherein the second deep neural network includes fewer parameters than the first deep neural network. Embodiments may also include determining whether to select an output from the first deep neural network or the second deep neural network and providing the selected output to a decoder with an overall objective of speeding up ASR.

18 Claims, 5 Drawing Sheets

(51) Int. Cl.
*G10L 15/06* (2013.01)
*G10L 15/30* (2013.01)

(58) Field of Classification Search
USPC .......................................................... 704/232
See application file for complete search history.

(56) References Cited

U.S. PATENT DOCUMENTS

| | | | | |
|---|---|---|---|---|
| 5,758,023 | A * | 5/1998 | Bordeaux | G10L 15/16 |
| | | | | 704/232 |
| 5,774,846 | A * | 6/1998 | Morii | G10L 19/06 |
| | | | | 704/202 |
| 6,311,157 | B1 * | 10/2001 | Strong | G10L 15/1822 |
| | | | | 704/243 |
| 7,899,669 | B2 * | 3/2011 | Gadbois | G10L 15/32 |
| | | | | 379/88.01 |
| 2002/0062212 | A1 * | 5/2002 | Nakatsuka | G10L 15/065 |
| | | | | 704/240 |
| 2002/0194002 | A1 * | 12/2002 | Petrushin | G10L 17/26 |
| | | | | 704/270 |
| 2003/0033144 | A1 * | 2/2003 | Silverman | G10L 15/20 |
| | | | | 704/233 |
| 2003/0033153 | A1 * | 2/2003 | Olson | G06F 1/1605 |
| | | | | 704/275 |
| 2004/0128135 | A1 * | 7/2004 | Anastasakos | G10L 15/30 |
| | | | | 704/270.1 |
| 2004/0148163 | A1 | 7/2004 | Baker | |
| 2005/0027527 | A1 * | 2/2005 | Junkawitsch | G10L 15/20 |
| | | | | 704/243 |
| 2006/0020462 | A1 * | 1/2006 | Reich | G10L 15/187 |
| | | | | 704/254 |
| 2007/0288236 | A1 * | 12/2007 | Kim | G10L 25/93 |
| | | | | 704/231 |
| 2010/0057453 | A1 * | 3/2010 | Valsan | G10L 25/78 |
| | | | | 704/232 |
| 2011/0093259 | A1 * | 4/2011 | Saffer | G10L 15/06 |
| | | | | 704/9 |
| 2012/0065976 | A1 | 3/2012 | Deng et al. | |
| 2012/0130716 | A1 * | 5/2012 | Kim | B25J 13/003 |
| | | | | 704/256.1 |
| 2013/0080161 | A1 * | 3/2013 | Iwata | G10L 15/24 |
| | | | | 704/231 |
| 2014/0012578 | A1 * | 1/2014 | Morioka | G10L 15/22 |
| | | | | 704/254 |
| 2014/0129218 | A1 * | 5/2014 | Liu | G10L 15/32 |
| | | | | 704/231 |
| 2015/0039299 | A1 * | 2/2015 | Weinstein | G10L 15/16 |
| | | | | 704/202 |
| 2015/0057995 | A1 * | 2/2015 | Neumann | G06K 9/00765 |
| | | | | 704/8 |
| 2015/0269931 | A1 * | 9/2015 | Senior | G10L 15/063 |
| | | | | 704/245 |
| 2016/0284348 | A1 * | 9/2016 | Yu | G10L 15/16 |

OTHER PUBLICATIONS

Notification Concerning Transmittal of International Preliminary Report on Patentability in related International App. No. PCT/US2014/055116 dated Mar. 23, 2017.

* cited by examiner

300

METHOD FOR SCORING IN AN AUTOMATIC SPEECH RECOGNITION SYSTEM

RELATED APPLICATIONS

The subject application is a U.S. National Stage Application of International Application No. PCT/US2014/055116, filed on Sep. 11, 2014, the contents of which are herein incorporated by reference in its entirety.

TECHNICAL FIELD

This disclosure relates to automatic speech recognition systems (ASR) and, more particularly, to a method for computing acoustic model scores in an automatic speech recognition system using one or more deep neural networks.

BACKGROUND

Automatic speech recognition may refer to the transcription, by a computing device, of spoken language into readable text. Some speech recognition (SR) systems use user or speaker specific training, where a speaker may read sections of text into the SR system. These systems are often configured to analyze the person's specific voice and use it to fine tune the recognition of that person's speech, resulting in more accurate transcription. In an effort to reduce word error rates, and increase accuracy, some ASR systems have begun to alter the way in which they attempt to improve recognition scores.

SUMMARY OF DISCLOSURE

In one implementation, a method, in accordance with this disclosure, may include receiving an audio signal at a first deep neural network ("DNN") associated with a computing device. Embodiments may further include receiving the audio signal at a second deep neural network ("DNN") associated with a computing device, wherein the second deep neural network includes fewer parameters than the first deep neural network. Embodiments may also include determining whether to select an output from the first deep neural network or the second deep neural network and providing the selected output to a decoder.

One or more of the following features may be included. In some embodiments, the method may include terminating a computation associated with at least one of the first deep neural network and the second deep neural network. The second DNN may be configured to share one or more trained weights from one or more layers of the first DNN. In some embodiments, the second deep neural network may include fewer hidden layers than the first deep neural network. The first deep neural network and the second deep neural network may be associated with different processing threads. Determining whether to select the output may be based upon, at least in part, one or more phonetic class conditional probabilities. The one or more phonetic class conditional probabilities may include at least one of speech, silence, vowels, and consonants. In some embodiments, determining whether to select the output may be based upon, at least in part, an entropy associated with the output from the first deep neural network or the second deep neural network. The method may include training a classifier for model selection using a training module, wherein an input to the training module includes the output from the second deep neural network. In some embodiments, determining whether to select the output may be based upon, at least in part, phonetic look-ahead information.

In another implementation, a system is provided. The system may include one or more processors configured to receive an audio signal at a first deep neural network ("DNN") associated with a computing device. The one or more processors may be further configured to receive the audio signal at a second deep neural network ("DNN") associated with a computing device, wherein the second deep neural network includes fewer parameters than the first deep neural network. The one or more processors may be further configured to determine whether to select an output from the first deep neural network or the second deep neural network. The one or more processors may be further configured to provide the selected output to a decoder.

One or more of the following features may be included. In some embodiments, the one or more processors may be further configured to terminate a computation associated with at least one of the first deep neural network and the second deep neural network. The second DNN may be configured to share one or more trained weights from one or more layers of the first DNN. In some embodiments, the second deep neural network may include fewer hidden layers than the first deep neural network. The first deep neural network and the second deep neural network may be associated with different processing threads. Determining whether to select the output may be based upon, at least in part, one or more phonetic class conditional probabilities. The one or more phonetic class conditional probabilities may include at least one of speech, silence, vowels, and consonants. In some embodiments, determining whether to select the output may be based upon, at least in part, an entropy associated with the output from the first deep neural network or the second deep neural network. The one or more processors may be further configured to training a classifier for model selection using a training module, wherein an input to the training module includes the output from the second deep neural network. In some embodiments, determining whether to select the output may be based upon, at least in part, phonetic look-ahead information.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards a system and method for scoring in an automatic speech recognition system using one or more deep neural networks. Embodiments of speech recognition process 10 may include a plurality of deep neural networks, each of varying complexity. Embodiments disclosed herein may be used to reduce the computational complexity and real-time factor of ASR when using deep neural networks as a scoring mechanism.

Figure 1:
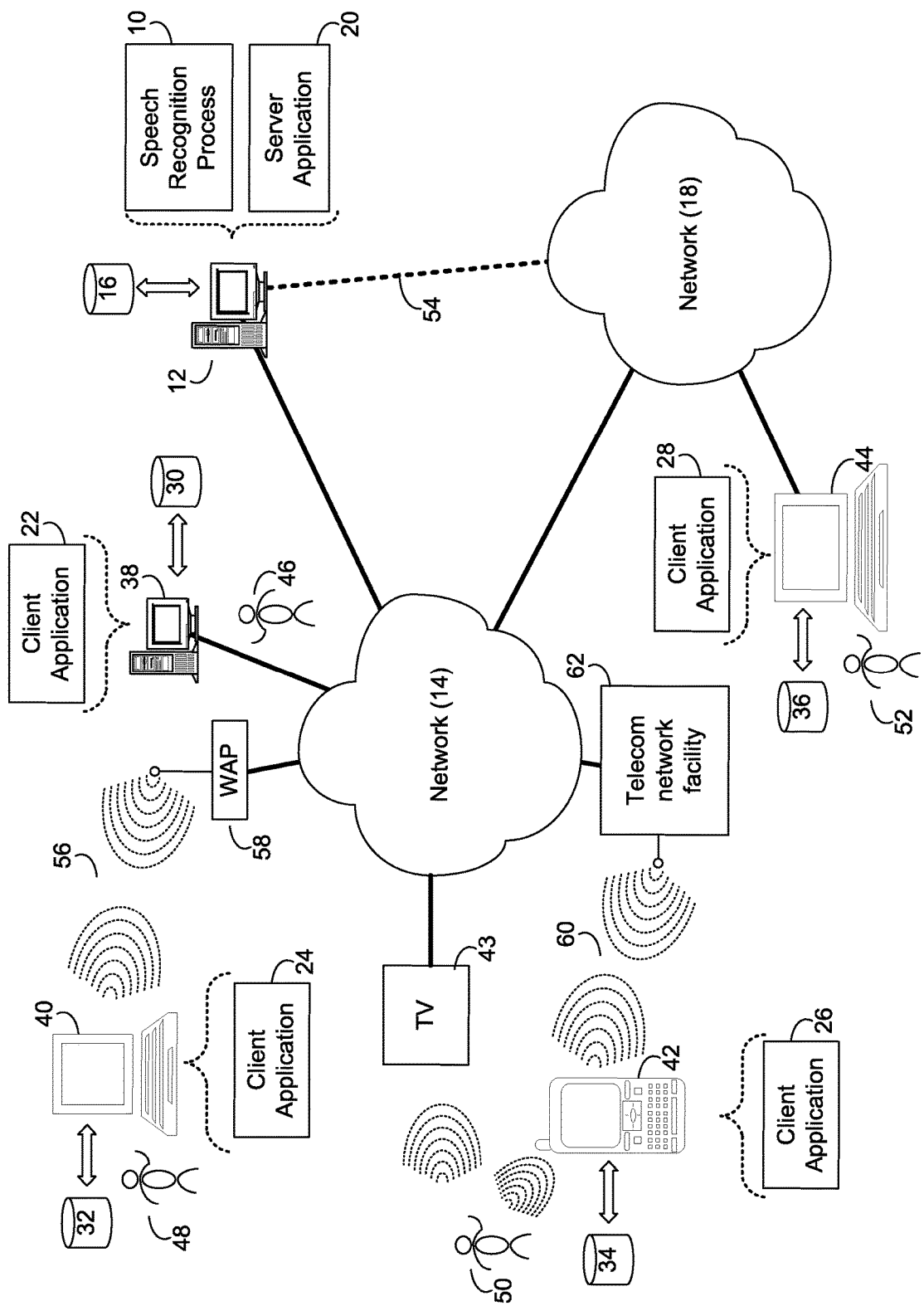
FIG. 1 is a diagrammatic view of a speech recognition process in accordance with an embodiment of the present disclosure.
Figure 2:
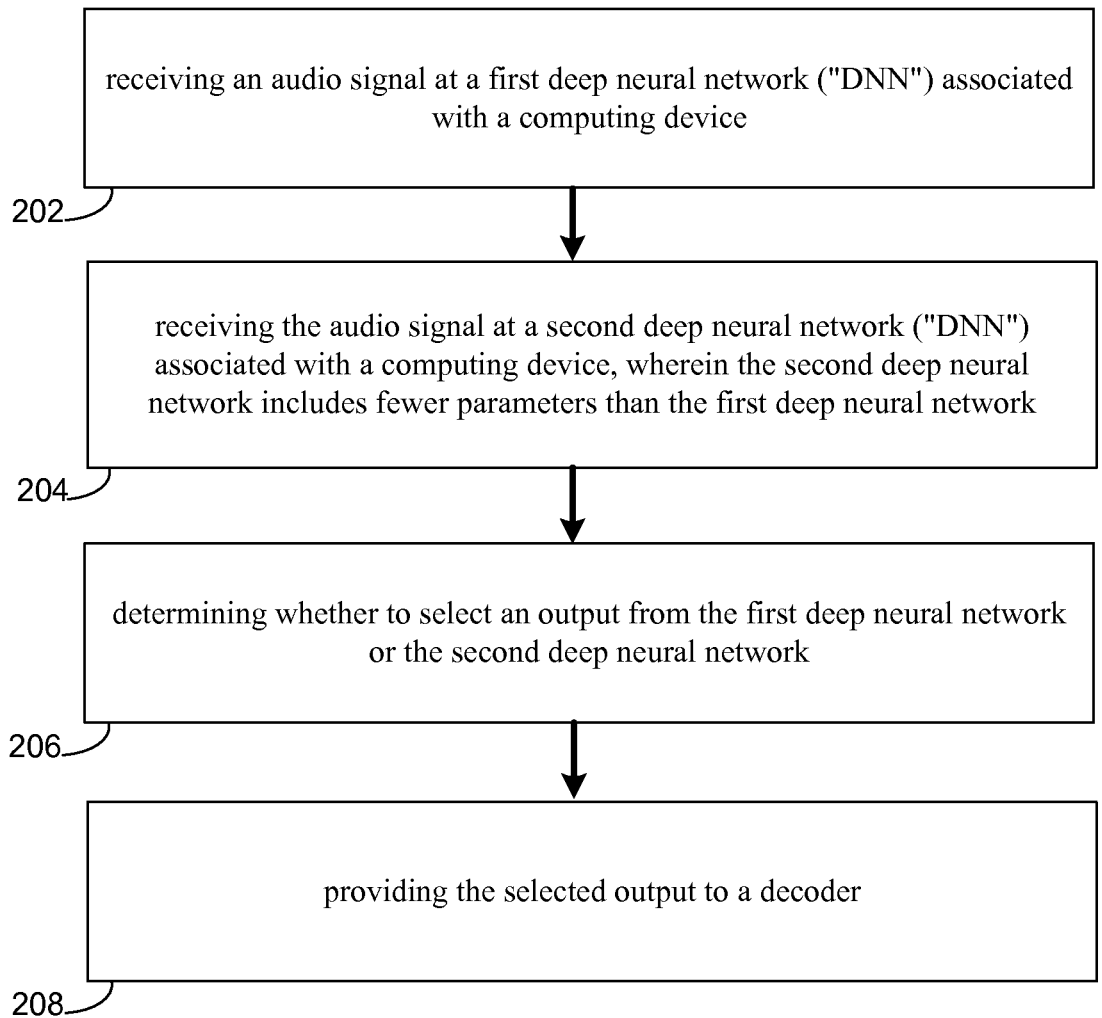
FIG. 2 is a flowchart of a speech recognition process in accordance with an embodiment of the present disclosure.

Referring to FIG. 1, there is shown a speech recognition process 10 that may reside on and may be executed by computer 12, which may be connected to network 14 (e.g., the Internet or a local area network). Server application 20 may include some or all of the elements of speech recognition process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-5, speech recognition process 10 may include receiving (202) an audio signal at a first deep neural network ("DNN") associated with a computing device. Embodiments may further include receiving (204) the audio signal at a second deep neural network ("DNN") associated with a computing device, wherein the second deep neural network includes fewer parameters than the first deep neural network. Embodiments may also include determining (206) whether to select an output from the first deep neural network or the second deep neural network and providing (208) the selected output to a decoder.

The instruction sets and subroutines of speech recognition process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, speech recognition process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of speech recognition process 10. Accordingly, speech recognition process 10 may be a purely server-side application, a purely client-side application, or a hybrid server-side/client-side application that is cooperatively executed by one or more of client applications 22, 24, 26, 28 and speech recognition process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and speech recognition process 10 directly through network 14 or through secondary network 18. Further, computer 12 may be connected to network 14 through secondary network 18, as illustrated with phantom link line 54. In some embodiments, users may access speech recognition process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14. The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 and server computing device 12.

Figure 3:
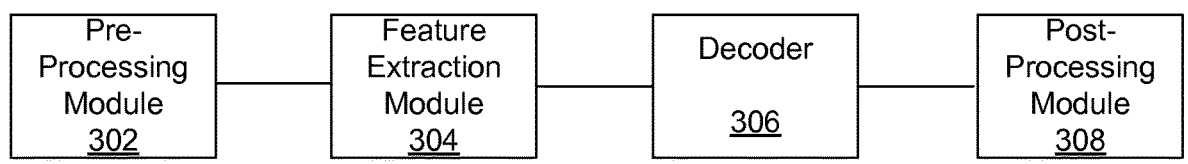
FIG. 3 is a diagrammatic view of a system configured to implement a speech recognition process in accordance with an embodiment of the present disclosure.

Referring now to FIG. 3, an embodiment depicting an automatic speech recognition system 300 that may be configured to implement speech recognition process 10 is provided. Speech recognition system may include pre-processing module 302, feature extraction module 304, decoder 306, and post-processing module 308. In some embodiments, and as is discussed in further detail below, speech recognition process 10 may be configured to generate an input for the decoder using one or more deep neural networks.

Embodiments of the present disclosure may utilize one or more deep neural networks in accordance with speech recognition process 10. More specifically, speech recognition process 10 may include deep neural networks (DNN) for use as a scorer in order to reduce word error rates. Accordingly, embodiments included herein may be used to reduce the computational cost and real time factor of ASR by using various DNNs and DNN configurations as a scorer.

Figure 4:
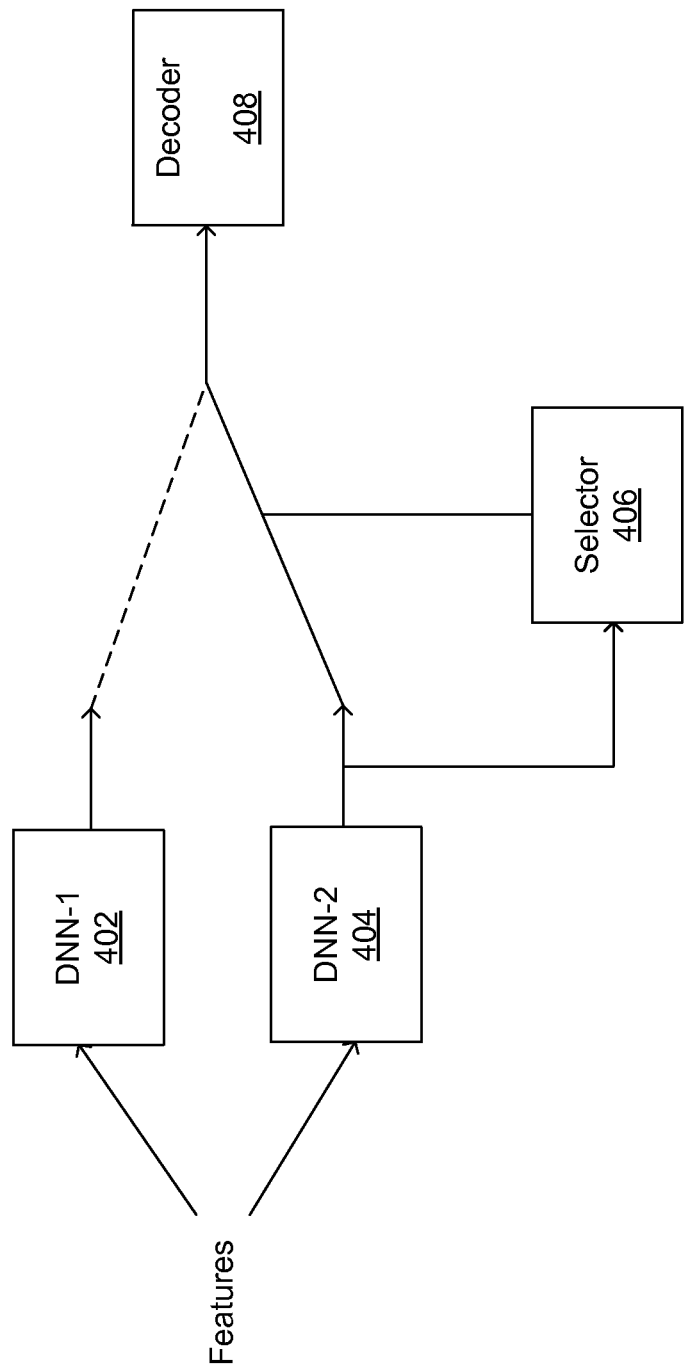
FIG. 4 is a diagrammatic view of a system configured to implement a speech recognition process in accordance with an embodiment of the present disclosure.

Referring now to FIG. 4, an embodiment depicting an architecture 400 including a plurality of DNNs in parallel is provided. In this particular example, first deep neural network 402 (e.g. DNN-1, which may include a number of parameters) may be trained to achieve the best performance taking into consideration the amount of training data. In some embodiments, this may be achieved with many hidden layers (e.g., 6-8 in a state-of-the-art ASR). Second deep neural network 404 (e.g. DNN-2, which may include fewer parameters than DNN-1) may be trained with a fewer number of hidden layers (e.g., 3-4) and, in some embodiments, a lower number of neurons per hidden layer. The lower model complexity may impact the classification accuracy and the final word error rate ("WER"), however the smaller model may require fewer computes and its evaluation may be faster. In some embodiments, only terminating the first (larger) DNN may be appropriate. The method may further include the concept of shared weights or parameters. If the second (smaller) DNN is trained independently of the first DNN, then it will consume additional memory, both in the RAM and the disk. The increase in memory consumption can be reduced to a large extent if the second DNN can reuse (or share) the trained weights from the first few layers of the first DNN. Only the final output layer of the second DNN need to be retrained and stored, thereby reducing the memory footprint.

In some embodiments, embodiments of speech recognition process 10 may be configured to select the phonetic class-conditional probabilities from either first deep neural network 402 or second deep neural network 404 depending on the output of DNN-2 or any other source of information. For example, if the output of second deep neural network 404 is selected, then the computation of first deep neural network 402 may not be invoked or may be terminated. Selector 406 may be configured to determine how the selection is made, as is discussed in further detail below.

In some embodiments, determining whether to select an output from first deep neural network 402 or second deep neural network 404 may be based upon a phonetic classification. For example, in the simplest case, the smaller second deep neural network 404 may be used for silence regions and the more accurate but slower first deep neural network 402 for speech regions. Since the incoming speech utterances may contain significant silence regions, this could lead to a lower overall real-time factor ("RTF") with minimal impact on the accuracy. The speech-silence information may be extracted from first deep neural network 402. Where first deep neural network 402 has non-speech probability higher than a certain threshold, the decision for non-speech may be made without consulting the larger network. Accordingly, speech recognition process 10 may select a particular DNN output based upon a determination of speech/silence, vowels/consonants or any suitable other phonetic classes.

In some embodiments, determining whether to select an output from first deep neural network 402 or second deep neural network 404 may be based upon an entropy of a particular output. For example, the quality of the posterior probabilities may be better in the central regions of the phonemes (particularly vowels). As such, the selection of DNN outputs may also be performed depending on the entropy of the DNN output. The threshold on entropy may be derived empirically on a development data set.

In some embodiments, speech recognition process 10 may be configured to train a classifier for model selection. For example, on development data, the similarity of the outputs of first deep neural network 402 and second deep neural network 404 may be estimated using any suitable approach. Some of these may include, but are not limited to, using the angle (cosine distance) or Kullback-Leibler distance between output vectors. A simpler model (e.g. a shallow MLP) may be trained on the output of second (smaller) deep neural network 404 as input and the first deep neural network 402 or second deep neural network 404 as output classes derived based on the cosine distance classification. In a particular embodiment, for classifier training purposes, the input may be the output of second deep neural network 404 and the output may be 0 (e.g., if the cosine distance between the output of the larger and smaller deep neural network is <threshold) and 1 otherwise.

In some embodiments, speech recognition process 10 may be configured to exploit the phonetic look-ahead information in the search space for DNN selection. Accordingly, the search space information may also be used in selecting the output of the DNNs. For example, the smaller second deep neural network 404 may be trained to model (discriminate) output classes that may represent a group of acoustically similar context dependent targets of first deep neural network 402. These grouped classes can be obtained by cutting the decision tree used in deriving the output classes of first deep neural network 402. Based upon the output of first deep neural network 402 and some additional information (e.g., the phonetic look ahead information from the search space) a determination may be made to either (a) select the output of the smaller second deep neural network 404 and split the probabilities across the leaves if the path is more likely to be pruned or (b) select the output of the more detailed first deep neural network 402 if it is less likely to be pruned out. Additionally and/or alternatively, the posteriors from second deep neural network 404 may be used to replace the calculation of the corresponding posteriors of first deep neural network 402 in the output layer. In some cases, any real calculation may be limited to certain areas (e.g., only the last softmax layer may be affected, etc.).

In some embodiments, speech recognition process 10 may be configured to train one or more deep neural networks either together or independently. For example, the activation values in a well-trained DNN may become progressively better (e.g., from the first layer to the last of the network) for phoneme/sub-phonemic classification and may contain fewer non-linguistic variability. A final output layer may be trained at one or more of the intermediate hidden layers to estimate posterior probabilities. In this way, the final output may be selected from any of the intermediate layers depending on some confidence measure. This may be viewed as multiple levels of additional refinements of posterior probability estimates towards meeting a certain entropy threshold or confidence estimate. Accordingly, embodiments of speech recognition process 10 may allow for implementations in more than two distinct networks, in a single combined network, or any hybrid thereof.

In some embodiments, and in the event that two or more parallel DNNs need to be different, the forward computation could be performed on different threads, which may result in a reduction in overall computes.

In some embodiments, the decision thresholds on non-speech posterior probability and entropy may be fixed and/or tuned on training data. The thresholds may also be adjusted (e.g., in supervised, unsupervised, online and/or offline fashion) based upon a computational load and/or speaker/channel/environment specific posterior distributions.

In some embodiments, speech recognition process 10 may be configured to select a particular architecture of an utterance based on the signal characteristics (e.g. signal to noise ratio) of the previous utterance or of the same utterance. For example, in some embodiments, larger first deep neural network 402 may be used initially and once reliable estimates of SNR are obtained, speech recognition process 10 may decide to continue or switch to the smaller second deep neural network 404.

In some embodiments, if there is very little difference between the frames n and (n−1) at the input of the deep neural network, speech recognition process 10 may be configured to use the output of frame (n−1) in place of computing the outputs.

Some ASR applications may require a tunable setting (or a sliding knob) to control the accuracy-speed tradeoff. This could be set as a preference by the user or determined automatically for optimal system performance. For instance, in the case of desktop dictation, an ASR setting with lower computational requirement may be preferred if the load on the machine is higher. Entropy based DNN selection may involve just one parameter for such control.

In some state-of-the-art ASR systems, a fast match may be first applied to reduce the overall search space for recognition. The fast match algorithms typically use coarser (or less detailed) units for acoustic modeling such as monophones (also known as context independent phonemes) or biphones. A large DNN estimates the phonetic class conditional probabilities for detailed modeling units (such as quintphones) and the smaller DNN (which shares a part of the weights of the larger DNN) can be used to estimate the phonetic probabilities for the coarser models for fast match.

As discussed herein, in some embodiments, speech recognition process 10 may be configured to determine whether to select the output based upon, at least in part, an entropy associated with the output from the first deep neural network or the second deep neural network. In some instances, for speedup, speech recognition process 10 may check the entropy of the output of the second (smaller) DNN. Additionally and/or alternatively, if it is possible to compute the entropy of the first (larger) DNN, that output may be used.

Figure 5:
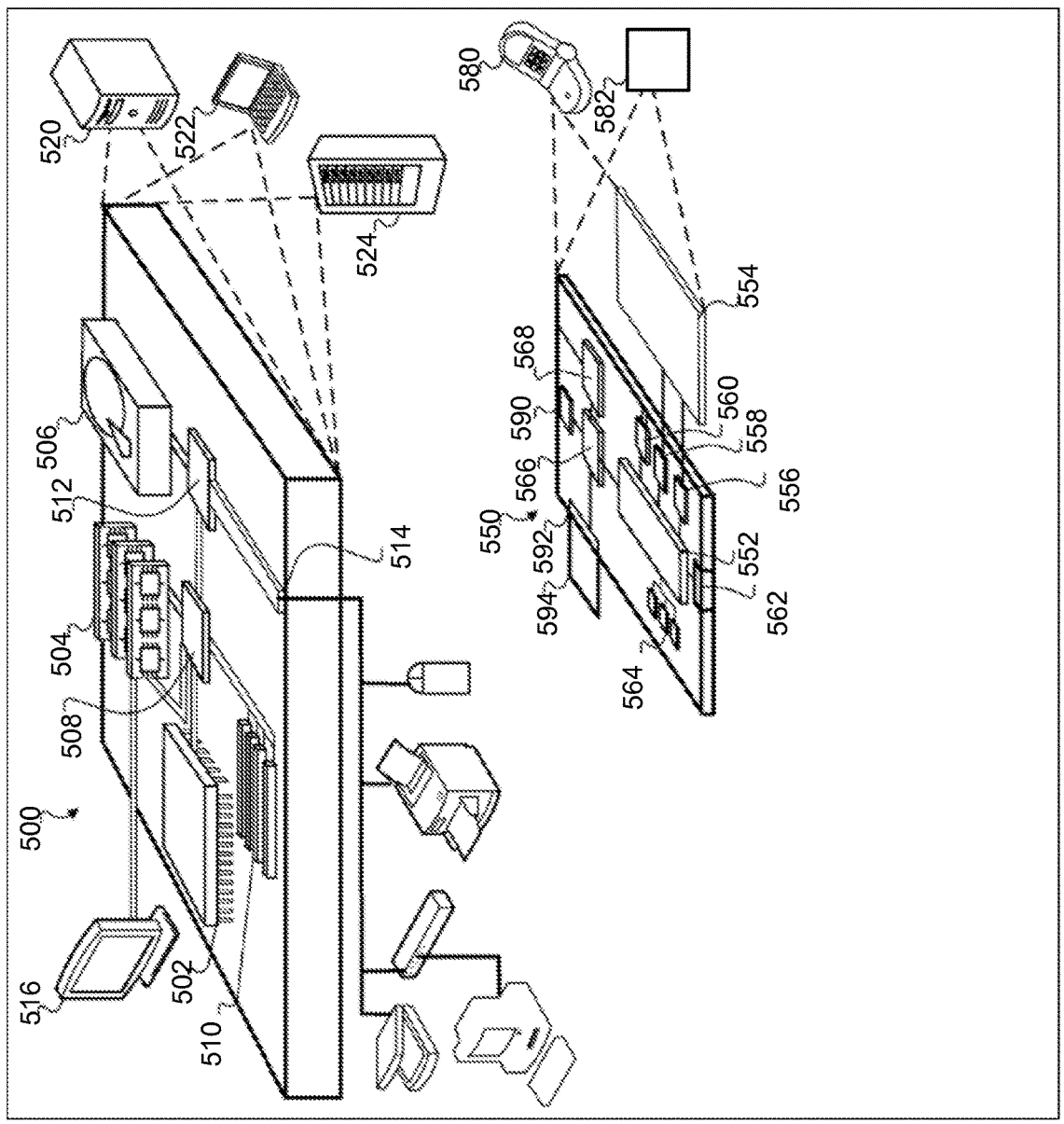
FIG. 5 shows an example of a computer device and a mobile computer device that can be used to implement the techniques described here.

Referring now to FIG. 5, an example of a generic computer device 500 and a generic mobile computer device 550, which may be used with the techniques described here is provided. Computing device 500 is intended to represent various forms of digital computers, such as tablet computers, laptops, desktops, workstations, personal digital assistants, servers, blade servers, mainframes, and other appropriate computers. In some embodiments, computing device 550 can include various forms of mobile devices, such as personal digital assistants, cellular telephones, smartphones, and other similar computing devices. Computing device 550 and/or computing device 500 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 500 may include processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, may be interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

Memory 504 may store information within the computing device 500. In one implementation, the memory 504 may be a volatile memory unit or units. In another implementation, the memory 504 may be a non-volatile memory unit or units. The memory 504 may also be another form of computer-readable medium, such as a magnetic or optical disk.

Storage device 506 may be capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

High speed controller 508 may manage bandwidth-intensive operations for the computing device 500, while the low speed controller 512 may manage lower bandwidth-intensive operations. Such allocation of functions is exemplary only. In one implementation, the high-speed controller 508 may be coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 may include a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, may be interconnected using various buses, and several of the components may be mounted on a common motherboard or in other manners as appropriate.

Processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

In some embodiments, processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

In some embodiments, memory 564 may store information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

Computing device 550 may be implemented in a number of different forms, as shown in the figure. For example, it may be implemented as a cellular telephone 580. It may also be implemented as part of a smartphone 582, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    receiving an audio signal at a first deep neural network associated with a computing device;
    receiving the audio signal at a second deep neural network associated with the computing device, wherein the second deep neural network includes fewer parameters than the first deep neural network;
    determining one or more phonetic class conditional probabilities of the audio signal, wherein the one or more phonetic class conditional probabilities include at least one of silence, vowels, and consonants;
    determining whether to select an output from one of the first deep neural network and the second deep neural network based upon, at least in part, the one or more phonetic class conditional probabilities of the audio signal; and
    selecting the output from one of the first deep neural network and the second deep neural network based upon, at least in part, the one or more phonetic class conditional probabilities of the audio signal.

2. The method of claim 1, further comprising:
    terminating a computation associated with at least one of the first deep neural network and the second deep neural network.

3. The method of claim 1, wherein the second deep neural network is configured to share one or more trained weights from one or more layers of the first deep neural network.

4. The method of claim 1, wherein the second deep neural network includes fewer hidden layers than the first deep neural network.

5. The method of claim 1, wherein the first deep neural network and the second deep neural network are associated with different processing threads.

6. The method of claim 1, wherein the one or more phonetic class conditional probabilities further include speech.

7. The method of claim 1, wherein determining whether to select the output is based upon, at least in part, an entropy associated with the output from one of the first deep neural network and the second deep neural network.

8. The method of claim 1, further comprising:
    training a classifier for model selection using a training module, wherein an input to the training module includes the output from the second deep neural network.

9. The method of claim 1, wherein determining whether to select the output is based upon, at least in part, phonetic look-ahead information.

10. A system comprising:
    one or more processors configured to receive an audio signal at a first deep neural network associated with a computing device, the one or more processors further configured to receive the audio signal at a second deep neural network associated with a computing device, wherein the second deep neural network includes fewer parameters than the first deep neural network, the one or more processors further configured to determine one or more phonetic class conditional probabilities of the audio signal, wherein the one or more phonetic class conditional probabilities include at least one of silence, vowels, and consonants, the one or more processors further configured to determine whether to select an output from one of the first deep neural network and the second deep neural network based upon, at least in part, the one or more phonetic class conditional probabilities of the audio signal, the one or more processors further configured to select the output from one of the first deep neural network and the second deep neural network based upon, at least in part, the one or more phonetic class conditional probabilities of the audio signal.

11. The system of claim 10, wherein the one or more processors are further configured to terminate a computation associated with at least one of the first deep neural network and the second deep neural network.

12. The system of claim 10, the second deep neural network is configured to share one or more trained weights from one or more layers of the first deep neural network.

13. The system of claim 10, wherein the second deep neural network includes fewer hidden layers than the first deep neural network.

14. The system of claim 10, wherein the first deep neural network and the second deep neural network are associated with different processing threads.

15. The system of claim 10, wherein the one or more phonetic class conditional probabilities further include speech.

16. The system of claim 10, wherein determining whether to select the output is based upon, at least in part, an entropy associated with the output from one of the first deep neural network and the second deep neural network.

17. The system of claim 10, wherein the one or more processors are further configured to train a classifier for model selection using a training module, wherein an input to the training module includes the output from the second deep neural network.

18. The system of claim 10, wherein determining whether to select the output is based upon, at least in part, phonetic look-ahead information.

* * * * *